S. W. Sears,
Lawn Mower.
No. 107,632. Patented Sep. 20, 1870.
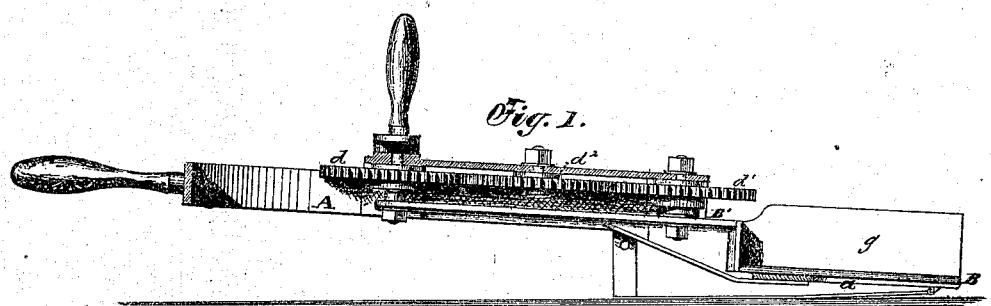
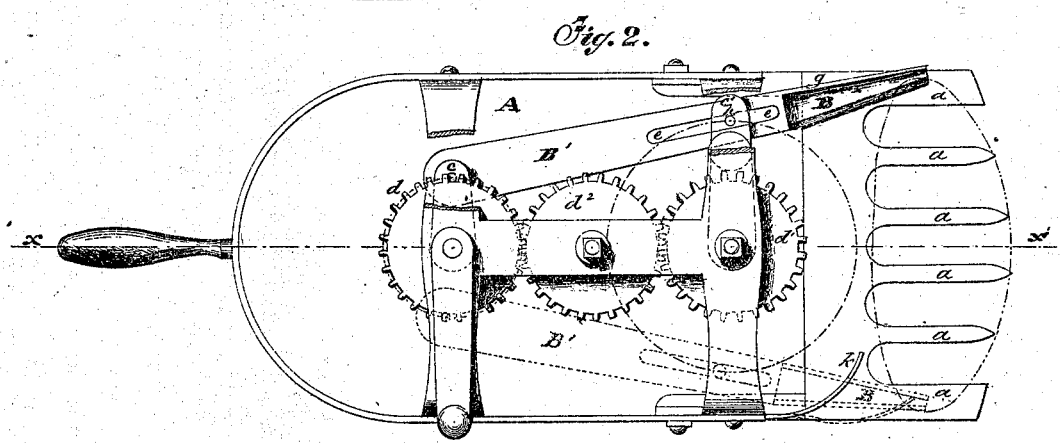
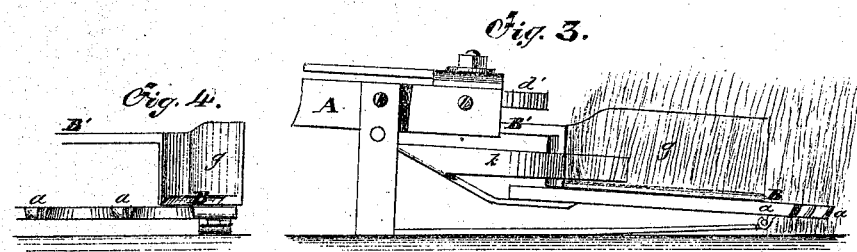
Witnesses Inventor

UNITED STATES PATENT OFFICE.

SAMUEL W. SEARS, OF NEW YORK, N. Y.

IMPROVEMENT IN GRASS-CUTTERS.

Specification forming part of Letters Patent No. 107,632, dated September 20, 1870.

*To all whom it may concern:*

Be it known that I, SAMUEL W. SEARS, of New York, in the county and State of New York, have invented a new and Improved Grass-Cutter; and I do hereby declare that the following is a full, clear, and exact description thereof, reference being had to the accompanying drawings, forming a part of this specification, in which—

Figure 1 is a sectional side view of my improved grass-cutter, taken centrally through the line $x\,x$, Fig. 2. Fig. 2 represents a plan of the grass-cutter. Fig. 3 represents a side view of the front end of the grass-cutter, as seen when in operation. Fig. 4 represents a front view of a detached portion, showing the cutting-knife B lying close down on the gathering-prongs $a\,a$.

Similar letters indicate corresponding parts in all the figures.

This invention relates to an improvement in the construction and operation of grass-cutters, designed more particularly for cutting grass on lawns and garden-walks by hand; and it consists in a single cutting-knife operated in such manner that the knife moves from one side to the other of the machine, forward and back, with a curved and drawing motion over a set of stationary streel prongs placed in front and having scissor-shaped edges. A full swath of grass is cut at each revolution or sweep of the cutting-knife, which is provided at the back with a shoulder piece or guard to catch the grass as it falls when cut, and carry it over to the off side, to be there discharged from the machine by a self-acting scraper or brush.

A steel or steel-faced set of pointed and sharp-edged prongs, $a\,a$, are attached to the front end of a frame, A, to penetrate the grass when the machine is moving close to the ground.

B is a broad, flat cutter, with a cutting-edge on one side and a long shank, B', pivoted at the rear end to the plate-crank $c$ on the cog-wheel $d$, while in the forward part of the shank is a slot, $e$, in which works a guide-pin, $h$, set on the plate-crank $c'$, attached to the front cog-wheel, $d'$. The cog-wheels $d$ and $d'$ both gear into an intermediate driver, $d^2$, which takes its motion either from a hand-crank, to be operated by the person pushing the grass-cutter, or by gearing connected with wheels or rollers on which the machine is mounted.

The cutting-knife B should have a quick motion, and when connected with cranks, as described, having a pivot at the rear end and a slot in the front end of the shank, the motion of the knife over the prongs $a\,a$ is elliptical, as indicated by the dotted lines in the drawings, Fig. 2. To give the cutting-knife B a circular motion over the prongs $a\,a$, whereby the edge will strike the grass more obliquely and cut it with a greater drawing action, the shank B' may be hung on two pivots, with cranks of equal length connected with the cog-wheels $d$ and $d'$.

On the back of the cutting-knife is a shoulder-guard, $g$, to catch the grass as it falls when cut, and carry it over to the side of the machine, where it is cleared off by a stationary brush or scraper, $k$, attached to the side of the frame A.

The cutting-knife B cuts a swath of grass at every movement or revolution over the prongs $a\,a$, about fifteen inches wide for a hand-machine.

I do not claim the advancing and retreating curvilinear motion of the knife; but What I do claim is—

A grass-cutter constructed substantially as described, having a single knife, B, hung in a suitable frame, A, and arranged to move in a curvilinear path from one side to the other of the machine over the prongs $a\,a$, and passing in the rear of said prongs on its return movement.

SAM. W. SEARS.

Witnesses:
 WM. P. CHAMBERS,
 LO. WATSON.